(12) United States Patent
Jauering et al.

(10) Patent No.: US 9,171,186 B2
(45) Date of Patent: Oct. 27, 2015

(54) METHOD FOR EXECUTING AN APPLICATION

(75) Inventors: Matthias Jauering, Munich (DE);
Dorothee Hilmer, Munich (DE);
Ludger Holtmann, Hohenlinden (DE);
Jorn Treger, Rosenheim (DE);
Ingeborg Fladee, Munich (DE)

(73) Assignee: GIESECKE & DEVRIENT GMBH, Munich (DE)

( * ) Notice: Subject to any disclaimer, the term of this patent is extended or adjusted under 35 U.S.C. 154(b) by 0 days.

(21) Appl. No.: 13/576,278

(22) PCT Filed: Feb. 1, 2011

(86) PCT No.: PCT/EP2011/000451
§ 371 (c)(1),
(2), (4) Date: Jul. 31, 2012

(87) PCT Pub. No.: WO2011/095320
PCT Pub. Date: Aug. 11, 2011

(65) Prior Publication Data
US 2012/0297479 A1 Nov. 22, 2012

(30) Foreign Application Priority Data
Feb. 2, 2010 (DE) .......................... 10 2010 006 572

(51) Int. Cl.
*G06F 21/77* (2013.01)

(52) U.S. Cl.
CPC ...................................... *G06F 21/77* (2013.01)

(58) Field of Classification Search
CPC ............ H04L 63/1416; H04L 63/1458; H04L 63/1408; H04L 63/145; H04L 63/1441; G06F 2201/87; G06F 11/3612; G06F 11/3466; G06F 2209/542

USPC .................................................. 717/168–173
See application file for complete search history.

(56) References Cited

U.S. PATENT DOCUMENTS

| | | | | |
|---|---|---|---|---|
| 5,574,854 A | * | 11/1996 | Blake et al. ...................... | 714/28 |
| 5,909,545 A | * | 6/1999 | Frese et al. ..................... | 709/208 |
| 7,072,876 B1 | * | 7/2006 | Michael .......................... | 706/45 |
| 7,739,689 B1 | * | 6/2010 | Spertus et al. ................. | 719/317 |
| 7,900,194 B1 | * | 3/2011 | Mankins ........................ | 717/127 |

(Continued)

FOREIGN PATENT DOCUMENTS

| | | |
|---|---|---|
| CN | 1371050 A | 9/2002 |
| CN | 1537273 A | 10/2004 |

(Continued)

OTHER PUBLICATIONS

International Search Report for PCT/EP2011/000451, Jul. 4, 2011.

(Continued)

*Primary Examiner* — Lisa Lewis
*Assistant Examiner* — Lizbeth Torres-Diaz
(74) *Attorney, Agent, or Firm* — Workman Nydegger

(57) ABSTRACT

The invention describes a method for executing an application (A) which comprises executable native or interpretable code and calls functions of an operating system (BS), whereby the operating system (BS) transmits a result of the respective function call (f1) to the application (A). The method according to the invention is characterized by the fact that the application (A) checks the result of a respective function call for a falsification, so as to detect an attack.

11 Claims, 2 Drawing Sheets

(56) References Cited

U.S. PATENT DOCUMENTS

| | | | |
|---|---|---|---|
| 2002/0016940 A1* | 2/2002 | Ju | 714/718 |
| 2002/0138755 A1* | 9/2002 | Ko | 713/201 |
| 2003/0046582 A1* | 3/2003 | Black et al. | 713/201 |
| 2006/0150025 A1* | 7/2006 | Hughes | 714/38 |
| 2007/0100902 A1* | 5/2007 | Sinha et al. | 707/201 |
| 2010/0031357 A1* | 2/2010 | Schaal et al. | 726/22 |
| 2011/0302450 A1* | 12/2011 | Hickey et al. | 714/17 |
| 2012/0284792 A1* | 11/2012 | Liem | 726/22 |

FOREIGN PATENT DOCUMENTS

| | | | | |
|---|---|---|---|---|
| CN | 101408917 A | | 4/2009 | |
| CN | 101533442 A | | 9/2009 | |
| EP | 1143688 A1 | * | 10/2001 | ............ H04M 1/247 |
| EP | 1892639 A2 | | 2/2008 | |
| WO | WO 2007098642 A1 | * | 9/2007 | |
| WO | WO 2007122495 A2 | * | 11/2007 | ............. G06F 21/00 |
| WO | 2009138892 A1 | | 11/2009 | |

OTHER PUBLICATIONS

Hagai Bar-El, et al., "The Sorcerer's Apprentice Guide to Fault Attacks", Internet Citation, May 7, 2004, XP002329915, retrieved from Internet: http://eprint.iacr.org/2004/100.

Wolfgang Rankl, et al., "Smart Card Handbook", Jan. 1, 2008, 4th edition, translated by Kenneth Cox, p. 457.

International Preliminary Report on Patentability for PCT/EP2011/000451, Aug. 7, 2012.

* cited by examiner

METHOD FOR EXECUTING AN APPLICATION

BACKGROUND OF THE INVENTION

A. Field of the invention

The invention relates to a method for executing an application which comprises executable native or interpretable code and calls functions of an operating system, whereby the operating system transmits a result of a respective function call to the application. The invention further relates to a portable data carrier, in particular a chip card or a security module.

B. Related Art

In the area of chip cards so-called error-inducing attacks are known, which manipulate the program sequence or the memory content of a memory of the chip card. For example upon an attack it can be attempted with the aid of the differential fault analysis (DFA) to spy out secret keys by selectively interspersing erroneous computations. With the aid of a light attack it is attempted to change a security status of the chip card in a targeted fashion, to read out secret data which otherwise would be readable only upon the presence of an authentication. Against such attacks various defense mechanisms were developed, which are based on both software measures and hardware measures. Here the attack detection is regularly effected by an operating system of the chip card or by the functions of the operating system which can be called by applications on the chip card.

In a portable data carrier with an application calling functions of an operating system and containing executable native or interpretable code, the result of the function call can be falsified by an attack, for example a light attack, without it being possible for the application to detect the falsification.

SUMMARY OF THE DISCLOSURE

It is therefore the object of the present invention to specify a method with which the security upon executing an application can be further improved. It is a further object of the invention to specify a portable data carrier which has improved security upon executing an application.

The invention creates a method for executing an application that comprises executable native or interpretable code and calls functions of an operating system, whereby the operating system transmits a result of a respective function call to the application. According to the invention the application checks the result of a respective function call for a falsification, so as to detect an attack. By proceeding according to the invention the security from manipulations can be increased. Unlike the state of the art, a check for manipulation is not effected by the operation system, but by the application itself, which calls the functions of the operating system.

In particular an improvement of security is created in such applications in which the operating system supplies to the application merely a Boolean variable as result. This is the case for example upon verifying signatures. Here every result value that is unequal to zero is interpreted as true by the application. The probability of a successful attack on the result value transmitted by the operating system to the application is strongly increased here, since every falsified result leads to the successful verification of an invalid signature. According to the invention the check of the results transmitted to the application is effected by the application itself, whereby in the case of a detected attack suitable counter measures can be taken.

The method according to the invention is executed in particular on a portable data carrier, in particular a chip card or a security module.

Expediently for checking the result of a respective function call a further function of the operating system is called by the application. Therein it is in particular provided that the call of a respective function of the operating system by the application takes place via a first interface and the call of the further function by the application takes place via a second, in particular proprietary interface. Via the second interface the results of preceding, security-relevant processes can be checked in a simple fashion, without having to influence the mode of working and functioning of the first interface. Through the extension by the second interface thereby also a check of results transmitted by an operating system can take place in such environments which are standardized and not alterable.

A further embodiment provides that a central, uniform check of respective results of different function calls is performed. In particular it is provided that a check of the last function call takes place. By means of this check it can be ascertained whether the called functions were actually executed and whether the received return value corresponds to the actual result. In this fashion attacks can be detected with a high probability.

A further embodiment provides that for checking the result of a respective function call the result determined by the operating system and transmitted to the application is transmitted to the operating system and verified by the latter. The transmission of the result from the application to the operating system here takes place preferably via the second interface, whereby existing standards with regard to the communication between the application and the operating system via the first interface need not be changed or extended.

In an advantageous fashion the further behavior of the portable data carrier can be controlled by the application in dependence on the result of the check. The control of the further behavior of the portable data carrier comprises a time delay and/or a turning-off of the data carrier. The respectively selected reaction can take place in dependence on the result of the check by the application.

An attack on the call of the function could already change the called function. Further protection is possible from (correct) results of a wrong function, i.e. a function other than that called by the application. Besides the result of a function call the application can also verify whether actually the called function was executed. The application transmits a check parameter to the operating system that identifies the called function. The operating system has stored a reference parameter for the function called (last) and checks said reference parameter against the check parameter. The parameter is preferably transmitted to the operating system together with the result and the parameter is checked within the framework of the check of the result. Thus, should a function other than the called function have supplied the result, this is detected within the framework of the check.

The checked function call should preferably be the last function call. However, not all function calls of the application have to be security-relevant functions. The further function calls are not secured as suggested herein, however, with their result thus not being stored by the operating system for a check. In particular the check of the result is to be possible respectively for the last security-relevant function call. Only the results of security-relevant function calls can be checked. Further (not security-relevant) function calls can take place between the call of the security-relevant function and the check of the result of the last called security-relevant function by the application.

In a concrete embodiment as application a Java card applet and as operating system a Java card VM (virtual machine) is used. The data carrier on which the application and the operating system run is preferably a Java card.

A data carrier according to the invention, which is in particular configured in the form of a chip card or of a security module, is configured so as to execute the above-described method according to the invention.

DESCRIPTION OF THE DRAWINGS

The invention will be described more closely hereinafter with reference to the figures. The figures are described as follows.

DETAILED DESCRPTION OF PREFERRED EMBODIMENTS OF THE INVENTION

The present invention proceeds from an application A which calls functions of an operating system BS. The application A for this purpose contains executable native or interpretable code. Although the invention can be applied generally to any application that runs on an operating system, the exemplary embodiment described hereinafter proceeds from a Java card as portable data carrier, on which a virtual machine processes function calls of a Java applet.

Figure 2:
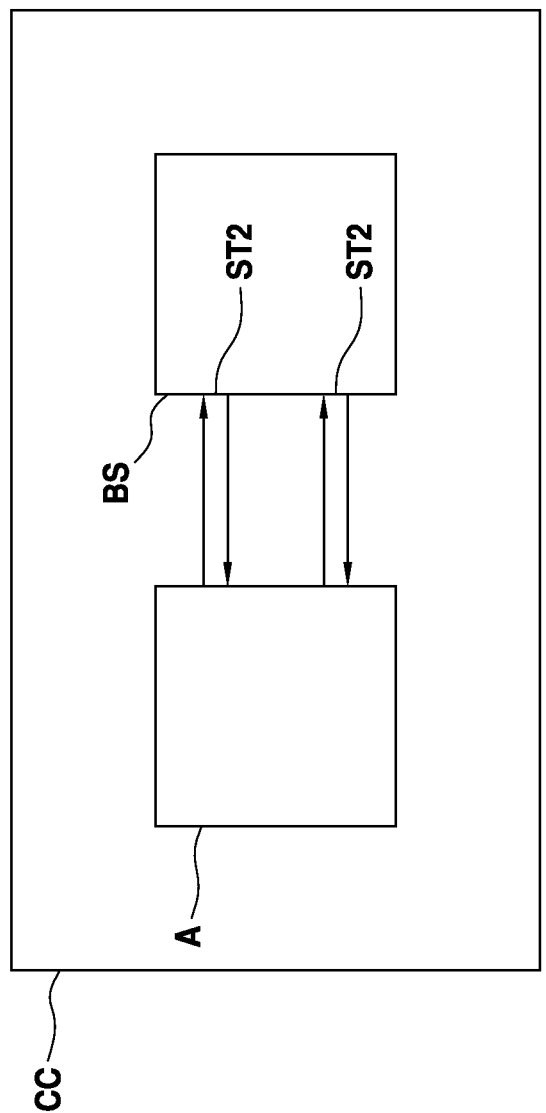
FIG. 2 a schematic representation of a portable data carrier according to the invention.

The application A can access the operation system BS of the Java card CC via two interfaces ST1, ST2 (cf. FIG. 2). Via the first interface ST1 functions of the operation system BS are called by the application A. The first interface ST1 is for example a Java card API. The second interface ST2, which is in particular of a proprietary nature, offers additional functions to the application which are suitable to increase security. In particular the application can verify, by means of the interface ST2, a result transmitted by the operating system BS to the application A following a function call.

The provision of the additional, second interface ST2 remedies security-critical weaknesses, such as exist for example in the Java card API by Sun Microsystems. By the exception of the command "verify PIN", in which a status is modified that can be queried from the operation system by the application, the Java card API supplies a Boolean value back to the application A. Regarding security-relevant functions, such as e.g. the verification of signatures, thus as return merely a Boolean value is used which is returned to the application A. It is true that said value is extended internally to form a 2-byte value. However, every value that is unequal to zero is interpreted as true. Therefore the probability of a successful attack on the return value is strongly increased, since every falsified result leads to the successful verification of an invalid signature, without the application A being in a position to detect such an attack.

Through the second, proprietary interface ST2 the security from manipulations can be increased in that the results supplied back to the application A by the operation system BS are checked. In dependence on the result of the check the Java card can be set to a secure state if required.

The second interface ST2 allows to make new functions available for checking the results of preceding, security-relevant processes. For this purpose, independent of the result value that is returned by the operating system BS to the application A via the first interface ST1, internally a further result value can be maintained, which can be queried by the application A at a suitable point in the program sequence. By means of this result value it can be checked whether the called functions of the application were actually executed by the operating system. Herewith a verification takes place whether the result value received from the operating system corresponds to the actual result. Moreover, by methods made available by the second interface ST2 the possibility is offered to react to the result of a check. For example the Java card can be turned off or the time response of the Java card can be changed.

By making available the second interface ST2, result values transmitted by the operating system BS to the application A can be checked independently. In this fashion the successful detection of attacks and/or manipulations is possible.

The second interface ST2 can enable an application to report a detected attack.

Figure 1:
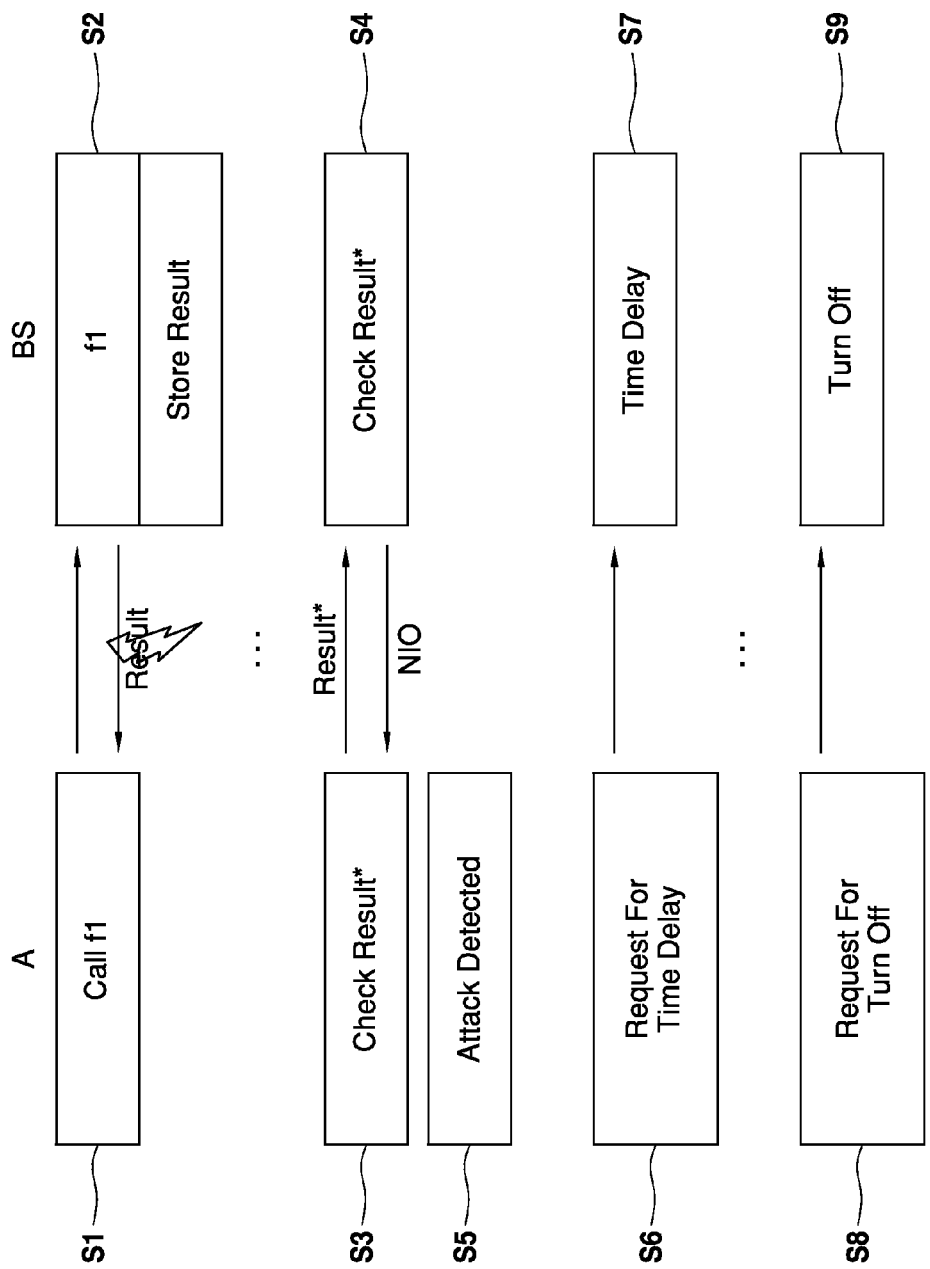
FIG. 1 a schematic sequence of the method according to the invention.

FIG. 1 represents the described behavior of the described Java card schematically. The application A in a process step S1 calls a function f1 of the operating system BS. In step S2 the operating system BS executes the function f1 and stores the result resulting therefrom. Further the result is transmitted via the first interface ST1 to the application A. When as result value merely a Boolean value is transmitted to the application A as result, this can be falsified in a simple fashion. This is assumed in FIG. 1 and schematically indicated by the arrow. The application A thus first receives as result from the operating system BS the value "result*". In step S3 the result value "result*" is checked in that said value is transmitted to the operating system BS. The operating system BS checks the result value "result*" received from the application A. Here it is ascertained that "result*" does not correspond to the result value "result" transmitted to the application A in step S2. Reacting thereto, the operating system BS in step S4 transmits an information "NIO", which signals a discrepancy of the result value transmitted in step S2 to the application A and the checked result value. In step S5 thus an attack is detected by the application A.

The communication between the application A and the operating system BS in the steps S3, S4 and S5 takes place via the second interface ST2. Via the second interface ST2 the application A is further enabled to react to the attack detected in step S5. Optionally the application can communicate the detected attack to the operating system. The operating system could react directly to this message. However, preferably the operating system first waits for the application to control a reaction to the attack.

In step S6 a request for a time delay is transmitted to the operating system BS. The former implements a time delay of the sequence of the Java card in step S7. The time delay requested by the application A can have a random duration.

Alternatively or additionally according to step S8 the request to turn off the Java card can be transmitted to the operating system BS. After receipt of the request the Java card is turned off by the operating system in step S9.

The interface ST2 offers to an application in particular also the following, additional functions, which are not represented in FIG. 2:

reporting of an attack detected by the application,
conditional turn-off request to the operating system, which causes a turning off by the operating system in the case that an error was detected or reported before and
resetting the result value memory of the last function call to a predefined state.

Reporting the detected attack makes possible a more flexible control by the application and/or offers to the operating system a better decision-taking basis for possible control measures of its own.

In a secure embodiment the result of the attack check is reported independently of the result. Also a conditioned turn-off request can always be run through by the application. By these two partial steps the sequence is made independent of the result of the check.

The resetting of a result value memory finally even enables the application to detect a targeted attack on the result check of the function call. When the result value memory of the operating system is reset to the value "0" for example, the application can test the function itself with a call with a result "1". This check would then even be possible independently of actual function calls.

The invention claimed is:

1. A method comprising the steps of:
   calling by an application a respective function call of an operating system, the application including executable native or interpretable code;
   transmitting from the operating system a result of the respective function call to the application, and
   checking by the application the result of the respective function call for a falsification to detect an attack by the application calling a further function of the operating system, wherein
   the further function called by the application is different from the respective function called, and
   the method is performed on a data carrier in the form of a chip card, security module, or USB token.

2. The method according to claim 1, wherein the calls of the respective function of the operating system by the application take place through a first interface and the call of the further function by the application takes place through a second interface.

3. The method according to claim 1, wherein the further function performs a central, uniform check of the respective results of different function calls.

4. The method according to claim 3, including making a check of a last function call.

5. The method according to claim 1, wherein for checking the result of the respective function call the result determined and transmitted to the application by the operating system is transmitted to the further function of the operating system and verified by the latter.

6. The method according to claim 1, wherein, in dependence on the result of the check, further behavior of the data carrier is controlled by the application.

7. The method according to claim 6, wherein the control of the further behavior of the data carrier comprises a time delay and/or a turning off.

8. The method according to claim 1, including using as the application a Java applet and as the operating system a Java virtual machine.

9. The method according to claim 1, wherein, in the step of checking the result of the respective function call, a parameter is transmitted to the operating system and verified by the operating system-the parameter indicating the function having provided the result.

10. A data carrier-comprising:
    an operating system, and
    a first interface that enables an application that is executable on the data carrier and that includes executable native or interpretable code to call a respective function of the operating system, wherein
    the operating system is configured to transmit a result of the respective function call to the application,
    the operating system makes available a second interface for the application and allows the application to call a further function of the operating system through the second interface to detect an attack by checking the result of the respective called through the first interface, and
    the data carrier is in the form of a chip card, security module, or USB token.

11. A data carrier-comprising:
    an operating system, and
    a first interface which enables an application which is executable on the data carrier and which comprises executable native or interpretable code to call a respective function of the operating system, wherein
    said operating system is configured to transmit a result of the respective function call to the application, and
    wherein the operating system makes available a second interface for the application, by which the application transmits the result of the respective function to the operating system to detect an attack.

* * * * *